(12) United States Patent
Phillips et al.

(10) Patent No.: US 6,217,506 B1
(45) Date of Patent: *Apr. 17, 2001

(54) METHOD OF CONTROLLING A FLUID

(75) Inventors: Robert John Phillips, Honiton; Christopher John Stuckey, Wimborne, both of (GB)

(73) Assignee: Normalair-Garrett (Holdings) Limited, Somerset (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/258,850

(22) Filed: Feb. 26, 1999

(30) Foreign Application Priority Data

Feb. 27, 1998 (GB) .................................................. 9804047

(51) Int. Cl.[7] .................................................. G05D 16/20
(52) U.S. Cl. .............................. 600/19; 137/14; 137/102; 137/487.5
(58) Field of Search .............................. 137/102, 487.5, 137/14; 600/19

(56) References Cited

U.S. PATENT DOCUMENTS

| 3,779,280 | 12/1973 | Evans et al. . |
| 4,566,868 | 1/1986 | Menzies . |
| 4,797,834 | 1/1989 | Honganen et al. . |
| 5,522,416 | * 6/1996 | Farrell et al. ........................ 600/19 X |

FOREIGN PATENT DOCUMENTS

| 0 540 079 A1 | 5/1993 | (EP) . |
| 2 192 737 | 1/1988 | (GB) . |
| WO 96/10779 | 4/1996 | (WO) . |

* cited by examiner

Primary Examiner—Gerald A. Michalsky
(74) Attorney, Agent, or Firm—Marshall, O'Toole, Gerstein, Murray & Borun

(57) ABSTRACT

A method of controlling a fluid in a life support system including at least one of a G-suit and a counterpressure garment including utilizing a control system comprising a control valve having a moveable part which is moved by an actuator in response to an input to the control system to operate the valve to bring a parameter of the fluid towards a desired value, the input being conditioned to provide a control signal to cause the actuator to move the moveable part of the valve and wherein the method comprises conditioning the input by comparing the input with reference information relating to the position of the moveable part of the valve, and when the comparison indicates that the position of the moveable part of the valve is not at a desired position, issuing the control signal incrementally to move the moveable part and updating the reference information so that the updated reference information is available for future comparison with the input.

9 Claims, 3 Drawing Sheets

METHOD OF CONTROLLING A FLUID

BACKGROUND TO THE INVENTION

This invention relates to a method of controlling a fluid in a life support system including at least one of a G-suit and a counterpressure garment e.g. for a member of an aircrew of a high performance aircraft.

Description of the Prior Art

It is common practice in a control system to sense the effect of operating a control effector such as a valve, in order to use feedback, so that the control effector may dynamically be adjusted in order that the actual parameter being controlled e.g. fluid pressure or flow, may be brought to a desired value. Thus control of the parameter is achieved purely in response to the effect of operating the effector. Such control is insufficiently refined for many applications and there is the possibility of the actual parameter being controlled not remaining within acceptable limits.

It is also known to measure e.g. using a transducer, the position of a moveable part of a valve, such as a valve stem, in response to a control input, to monitor and control the valve operation incrementally in response to a control signal, in an effort to keep the actual parameter being controlled within acceptable limits. However physically measuring position and making the necessary calculations is too slow for application to a high performance life support system.

SUMMARY OF THE INVENTION

According to a first aspect of the invention we provide a method of controlling a fluid in a life support system including at least one of a G-suit and a counterpressure garment, the method utilising a control system including a control valve means and there being means to provide an input to the control system to cause an actuator to move a moveable part of the valve means to operate the valve means to bring a parameter of the fluid towards a desired value, and means to condition the input to provide a control signal to cause the actuator to move the moveable part of the valve means characterised in that the method comprises conditioning the input by comparing the input with reference information relating to the position of the moveable part of the valve means, and when the comparison indicates that the position of the moveable part of the valve means is not at a desired position, issuing the control signal incrementally to move the moveable part and updating the reference information so that the updated reference information is available for future comparison with the input.

Thus the input to the control system may be modified to provide the control signal without having to determine the physical condition, e.g. actual position of a moveable part, of the valve means. Rather, the input may be modified with reference to a model of the valve means, which modification can thus be achieved much faster than in a physically dependant system, for optimum dynamic behaviour.

The input may comprise a signal derived from a comparison between an instructing signal and a feedback signal, the feedback signal containing information concerning the actual value of the parameter and the instructing signal depending upon a parameter value it is desired to attain. Thus the control system may incorporate a feedback arrangement as in conventional control systems although the sensitivity of the control system will not solely be dependant upon the feedback signal.

The reference information may comprise a model which models the physical response of the moveable part of the valve means to the control signal based upon known valve means characteristics so that when the reference information is updated the updated reference information is indicative of actual valve means moveable part position.

The model may be made as complex as desired to mimic the physical response of the valve means to the control signal. In its simplest form, the model may be a simple counter which counts incremental movements of the moveable part of the valve means in response to control signals, so that the count is indicative of the moveable part position.

The method may further comprise not providing the control signal to the actuator in the event that the comparison between the reference information and the input indicates that the moveable part is less than a predetermined distance from the desired position. In this way, operation of the valve which would achieve no meaningful control can be avoided and unnecessary valve activity can be reduced or prevented altogether.

In one arrangement the actuator is a stepper motor, the method comprising applying the control signal to drive the stepper motor to move a moveable part of the valve means a predetermined number of steps, e.g. one step.

The method may be repeated a sufficient number of times to move the moveable part of the valve means incrementally until the moveable part of the valve is at or substantially at a desired position.

According to a second aspect of the invention we provide a control system controlling a fluid in a life support system including at least one of a G-suit and a counterpressure garment, the control system including a control valve means which when operated changes a parameter of the fluid in the system, and a conditioning means to condition an input provided to the system to operate an actuator of the valve means, the conditioning means being adapted to condition the input by comparing the input with reference information relating to the position of the moveable part of the valve means and when the comparison indicates that the position of the moveable part of the valve means is not at a desired position, the conditioning means issuing the control signal incrementally to move the moveable part whilst updating the reference information so that the updated reference information is available for future comparison with the input.

A so called G-suit of a life support system, is an inflatable garment worn about at least the lower part of the body to prevent pooling of blood in the lower part of the body during aircraft manoeuvres which subject the aircrew member to high G forces. The life support system typically also includes means to provide the aircrew member with breathable gas, including an upper body inflatable garment (known as a counterpressure garment) to aid breathing, breathable gas being provided at an appropriate positive pressure for a given altitude, which pressure is most beneficially related to the pressure of the upper body inflatable counterpressure garment.

Conventionally such a life support system has been controlled so that there is a fixed relationship e.g. pressure ratio, between the pressures applied to the upper and lower body inflatable garments in a high altitude environment. This is because of the complexity of controlling these two parameters independently, usually by pneumatic means, particularly as the desired parameter values can rapidly change.

By virtue of the method of the first aspect and the control system of the second aspect of the invention, the pressures in the upper and lower body inflatable garments can independently be controlled as the system is inherently more flexible and adaptable than existing control systems.

According to a third aspect of the invention we provide a life support system for a pilot of an aircraft comprising at least one of a G-suit and a breathing system including a counterpressure garment, a control system according to the second aspect of the invention responsive to an input to control the pressure in the G-suit and/or breathing system.

The method of controlling the control system may be as the first aspect of the invention.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
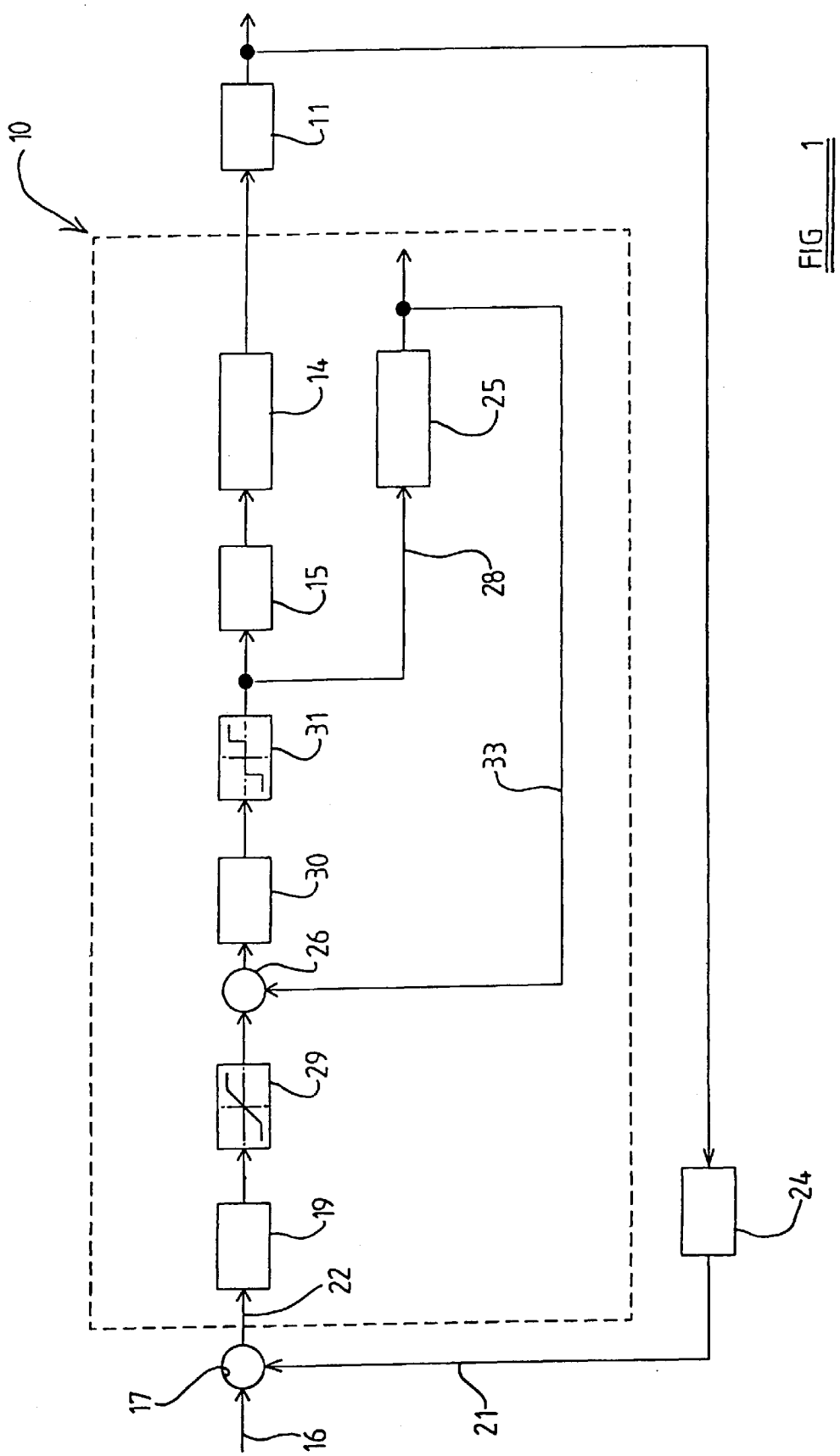
FIG. 1 is a diagrammatic illustration using standard control notation, of a control system.

Referring to FIG. 1 of the drawings there is shown in standard control notation, a control system 10 for controlling a parameter of a fluid, for example pressure in a G-suit 40 of a life support system 11 for an aircrew member of a high performance aircraft as described below in more detail with reference to FIG. 2.

The pressure in the G-suit 40 is changed by the operation of an effector 14 which in this case is the valve means described below with reference to FIG. 3 but may be another valve means which controls fluid pressure or flow in the life support system 11, when operated, the valve 14 is operated by a drive 15 such as a stepper motor or other actuator which moves a moveable part of the valve 14 directly or through a transmission of some kind.

An instructing signal is provided to the control system 10 along line 16 where it is fed to a comparator means 17. The comparator means 17 receives a further signal from a feedback loop along line 21. Depending on the difference between the instructing signal on line 16 and the feedback signal on line 21 i.e. the error, an input proper is then provided to the control system 10 along line 22.

The feedback loop includes a sensor 24 which senses the value of the parameter being controlled, in this example the pressure in the G-suit 40 or more typically in a hose 20 of the life support system 11 which is connected to the G-suit 40. Thus the input on line 22 represents the discrepancy between the desired parameter value in the life support system 11, i.e. pressure in the G-suit 40, information about which is contained in the instructing signal on line 16, and the actual parameter value i.e. pressure in the G-suit 40 as sensed by sensor 24 and information about which is contained in the feedback signal on line 21.

This input proper on line 22 is then used to operate the valve 14 by driving the actuator 15 thereof. As the pressure in the G-suit 40 changes in response to the operation of the valve 14, the feedback signal on line 21 will change, and so the input on line 22 will change. Thus in steady state conditions, the valve 14 will be operated so that a desired parameter value e.g. pressure in the G-suit 40 will be attained.

In a high performance aircraft, in practice, conditions rapidly change and thus the desired target fluid pressure in the G-suit 40 may change rapidly as the aircraft manoeuvres.

A control system 10 which would rely only on the feedback signal in line 21 to control the valve 14 cannot perform a fine control. This is because the signal from the comparator means 17 needs to be conditioned into a suitable control signal for the actuator 15, but without information about the physical response of the valve 14 to the control signal the effect of applying the control signal cannot be monitored. If a moveable part of the valve 14 were moved too far, or not far enough in response to a control signal, this would result in the parameter being varied by the valve 14, changing too much or not enough, which discrepancy could only be ascertained in response to the information from the sensor 24.

One example of an actuator 15 for the valve 14 is a stepper motor. As stepper motor design improves, such motors can be stepped increasingly quickly. Hence it is desirable in order to achieve fine and responsive control of the valve 14 operation, to be able to determine the physical response of the moveable part of the valve 14 to the control signal at a rate comparable with the stepping speed of the stepper motor 15, so that the valve 14 operation can be controlled incrementally. Systems in which the position of a moveable part of the valve 14 is monitored by physical means, cannot react sufficiently rapidly for use with e.g. a stepper motor 15, which can be stepped perhaps a thousand times a second.

In accordance with the invention there is provided a model effector 25 which contains reference information which may be used by the control system 10 more sensitively to control the operation of the valve 14. Also, using a model effector 25 rather than collecting data physically from the valve 14, a less expensive and more compact arrangement is provided.

Thus the physical response of the valve 14 to a control signal can be determined without physically monitoring the position of any moveable part of the valve 14, but the valve 14 response can be modelled in the model effector 25.

In the example shown in FIG. 1, the instructing signal on line 16 is obtained from e.g. a computer which monitors changing conditions in an aircraft. The instructing signal may for example call for an increased pressure in the G-suit 40 to compensate for increasing G-force experienced by an air crew member. The instructing signal on line 16 will thus contain information relevant to a target pressure to be achieved in the G-suit 40.

The error between the target pressure and the actual pressure determined by sensor 24 is thus provided as the input on line 22. The input needs to be conditioned to convert the error signal into a signal appropriate to the stepper motor or other actuator 15, and this is achieved as follows.

First the input is fed to a compensator 19 which makes adjustments to, for examples only the gain and the phase of the input, so that the magnitude and phase of the input is matched to the system 10 downstream.

Second the compensated input is limited by an input limiter 29 to ensure that the input does not call for a valve 14 operation beyond its physical ability. For example, the input limiter 29 may ensure that the valve 14 is not operated so that the moveable part of the valve 14 is demanded to be moved beyond its range of movement.

Third, the compensated and limited input is compared in a comparator means 26 with reference information from the model effector 25, which information is indicative of the position of the moveable part of the valve 14 as described below. Thus an error signal is obtained, being indicative of the error between the actual position of the moveable part of the valve 14 and a desired position as demanded by the input.

Fourth, this error signal is fed to a calculating means 30 which converts the error signal into a command signal for the actuator 15. For example where the actuator 15 comprises a stepper motor, the calculating means 30 may convert the error signal into a command signal to command the actuator 15 to perform a number or further number of incremental movements i.e. steps.

Fifth, the command signal is finally conditioned to a controller 31. The controller 31 determines whether the command signal requires a number of incremental movements greater than a predetermined number. If a greater number of incremental movements than the predetermined number is commanded, the controller 31 issues a control signal to actuator 15 to cause a usually single, incremental movement of the moveable part of the valve 14; where the controller 31 determines that a lesser number of incremental movements than the predetermined number is commanded, the controller 31 issues no command signal to the actuator 15. The predetermined number of incremental movements may be determined by the ability of the system to perform meaningful control. For example although the error signal obtained in the comparator means 26 may indicate that the moveable part of the valve 14 is not quite at its desired position, further adjustment of the position of the moveable part may not result in any noticeable change in parameter value, and hence such movement would be ineffectual.

When a control signal is issued to the actuator 15 to achieve an incremental movement of the moveable part of the valve 14, the reference information in the model effector 25 is updated along line 28, to reflect the change of actual position of the moveable part of valve 14 occasioned by the control signal, which updated information is then available for future comparison with the input.

In this way, the valve 14 is controllable incrementally and the iterative loop of the line 28, model effector 25 and line 33 from the model effector 25 to the comparator means 26, enables such incremental control at a rate generally as fast as the speed at which the actuator 15 can incrementally be operated. Thus the speed at which the actuator 15 can be operated accurately to bring the moveable part of the valve 14 to a desired position can be reduced compared with known control systems, so that the ability of the effector 14 to control the parameter e.g. gas pressure in the G-suit 40, is enhanced.

In its simplest form, the model effector 25 may be a simple counter to count the number of incremental movements the actuator 15 has been controlled to perform. For example, where the actuator 15 is a stepper motor, each issuance of a control signal by controller 31 would indicate that the moveable part of the valve 14 has been moved one increment by one step of the motor 15. However the model effector 25 may be more complicated to take account of for examples only, non-linear or other non-regular response of the actuator 15 to control signals and/or of non-regular response of the valve 14 to actuator 15 movement, over all or part of the range of movement of the moveable part of the valve 14, or temperature or pressure or the like dependent response. In this latter respect there could be a temperature or pressure or other sensor input to the model effector 25 from the actual valve 14 and/or actuator 15 or elsewhere so that the reference information is suitably updated in response to changing temperature or pressure or the like.

It will be appreciated that the control system 10 described has many advantages over a system which has physically to determine the position of a moveable part of the valve 14. Particularly the performance of the control system 10 can readily be adjusted statically or dynamically, by making changes to the reference information in the effector model 25 and/or to the compensation of the input provided by the compensating means 19, thus requiring no hardware changes.

Whereas it has been usual practice previously to control the pressure in an aircrew breathing system and in an air crew G-suit together, utilizing the present invention enables independent control of these functions more readily to be performed.

The control system 10 may be operated by the method of the invention using software control and/or electronic hardware components, as required.

Figure 2:
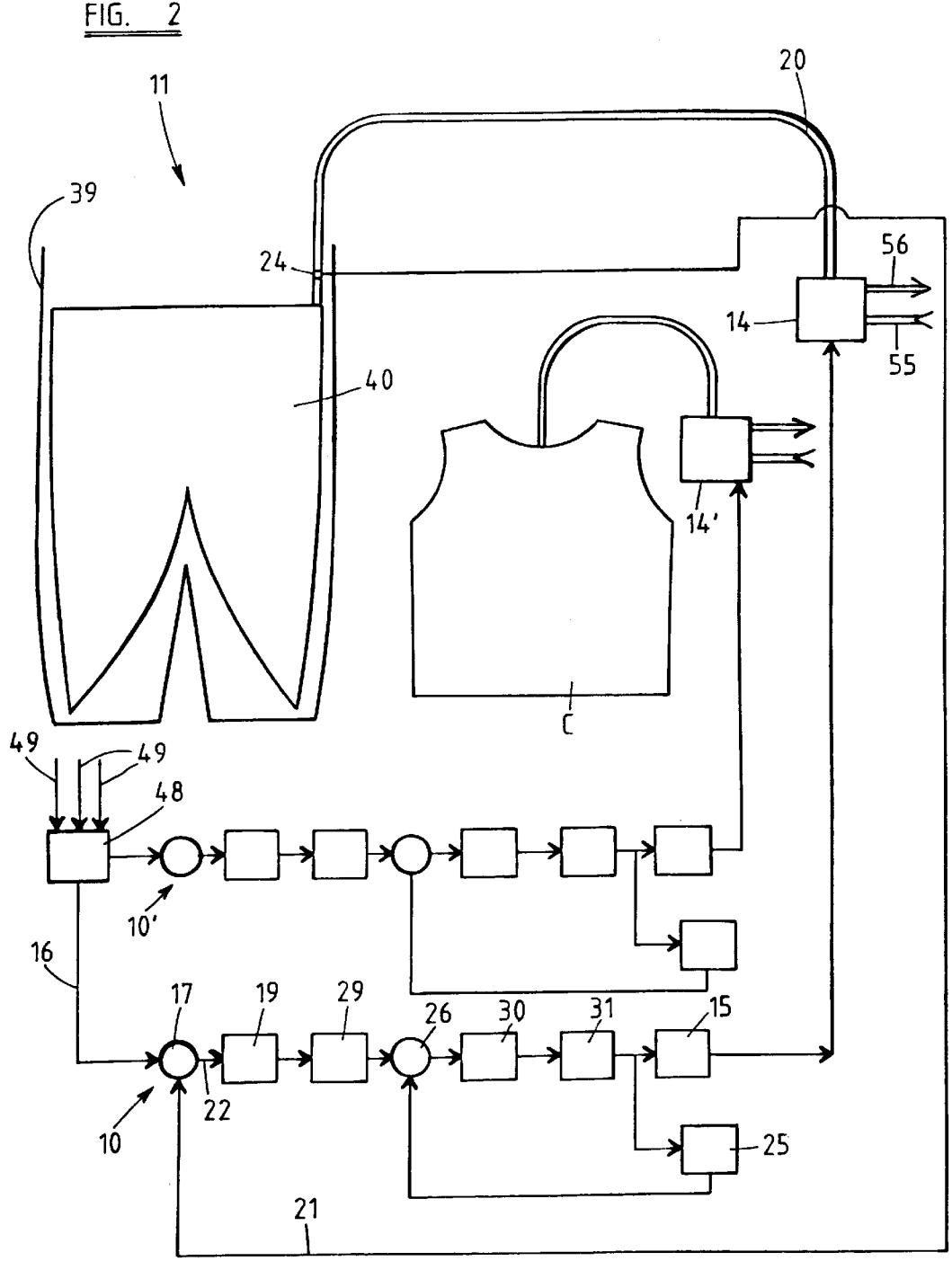
FIG. 2 is an illustrative view of a life support system incorporating the control system of FIG. 1.

Referring now to FIG. 2, part of a life support system 11 for an aircrew member 39 of a high performance aircraft is schematically illustrated, which system 11 comprises a G-suit 40 adapted to be worn about a lower portion of the body to which air may be applied to permit the G-suit 40 to be inflated to compensate for G-forces to which the aircrew member 39 is subjected as the aircraft manoeuvres.

The air is supplied along a supply hose 20 from a control valve 14. The control valve 14 is operative either to provide pressurised gas to the hose 20 when it is desired to inflate the G-suit 40 or to vent gas from the G-suit 40 when it is desired to deflate the G-suit 40.

Similar parts in FIGS. 1 and 2 are similarly labelled with appropriate reference numerals.

The instructing signal for the control system 10 is obtained from an on-board computer 48 which is responsive to a plurality of inputs 49 provided by sensors on the aircraft or aircrew, to determine the actual or predicted aircraft condition. Thus the computer 48 is responsive actual or predicted aircraft manoeuvres and/or aircrew condition.

The computer 48 may also provide an instructing signal to a control system 10' for controlling a valve 14' which may be substantially the same as valve 14, which is operated to inflate and deflate a counterpressure garment C of a breathing system of the life support system 11, to a breathing regulator, oxygen producing apparatus and otherwise as desired. Preferably the breathing system and G-suit 40 are controlled independently through respective control systems 10' and 10 by computer 48.

Figure 3:
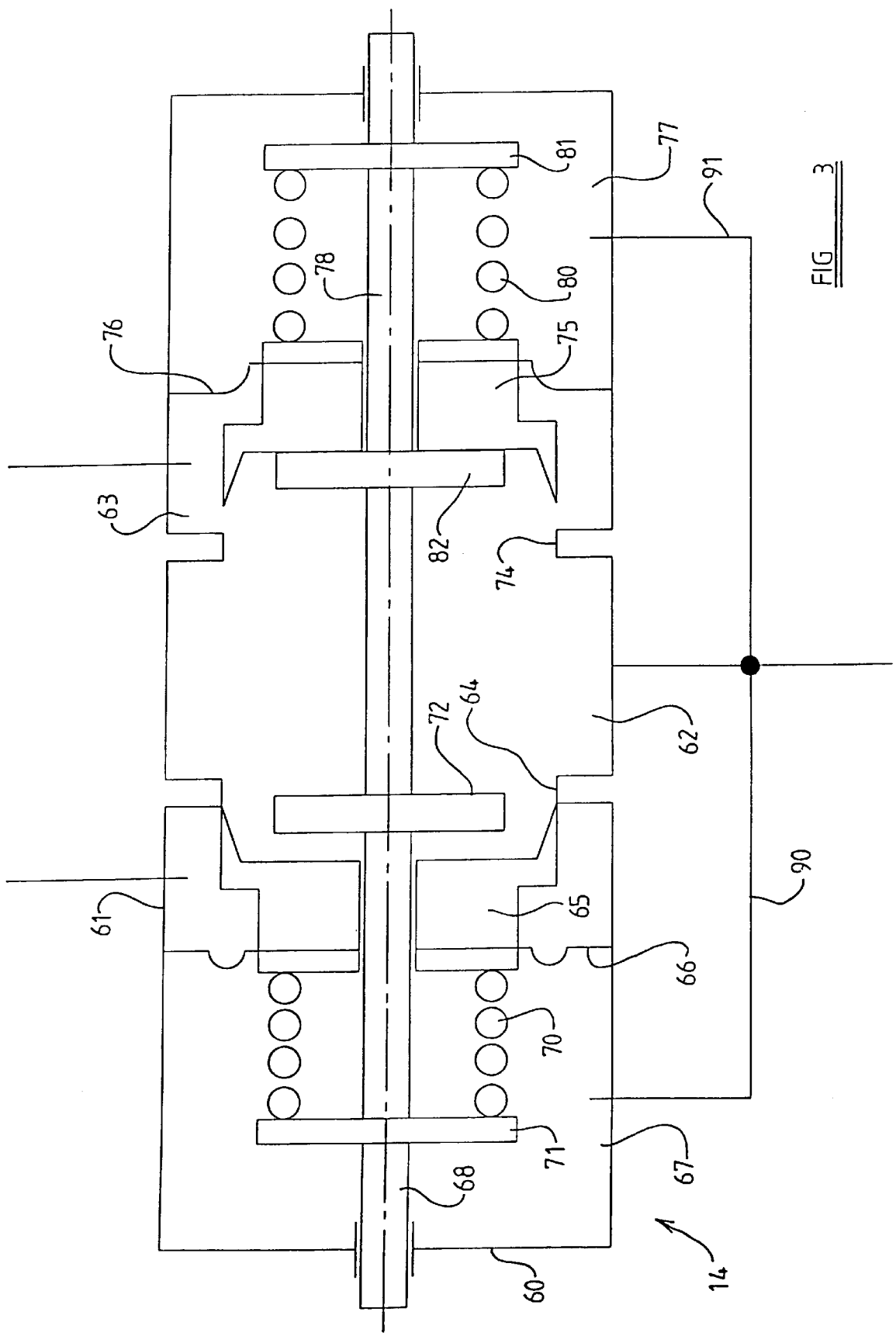
FIG. 3 is an illustrative view of a valve which may be used in the life support system of FIG. 2.

Referring now also to FIG. 3, an example of a valve 14 which may be used in the arrangements of FIGS. 1 and 2 will now be described. In this example the valve 14 performs the dual functions of connecting the G-suit 40 to a supply of pressurised gas 55 to inflate the G-suit 40, and to a vent 56 to permit of deflation of the G-suit 40. However in another arrangement, these two functions may be performed by a pair of valves operating in tandem as will be appreciated from the description below.

The valve 14 comprises a valve body 60 comprising first 61, second 62 and third 63 ports, the first 61 and third ports 63 being provided at one side of the body 60, and the second port 62 at an opposite side of the body 60.

A first valve seat 64 is provided between the first 61 and second 62 ports with which a first valve member 65 is engageable to close communication between the first 61 and second 62 ports. The first valve member 65 is mounted by a diaphragm 66 which closes a first chamber 67 within the valve body 60. Alternatively the valve member 65 may be integral with the diaphragm 66 or mounted or integral with a piston which closes chamber 67. The first valve member 65 is also slidable on a valve stem 68 within the body, 60, which valve stem 68 is moveable by an actuator comprising in this example a stepper motor 15 (see FIG. 1) which is operated by a control signal from the control system 10.

The first valve member 65 is biased into engagement with the first valve seat 64 by a biasing means comprising in this example a coil spring 70, although another biasing means may be provided as desired. The spring 70 bears at one end on a reaction element 71 comprising a stop carried on the valve stem 68, and the spring 70 bears at its opposite end on the first valve member 65. Alternatively, the reaction element 71 may be provided by the body 60 or elsewhere, and need not bear directly on the valve member 65.

The valve stem 68 is connected to the actuator stepper motor 15. Preferably, the output shaft of the stepper motor 15 is threaded, and carries a female threaded member which moves along the output shaft as the output shaft is rotated. The female threaded member is coupled to the valve stem so that the stepped rotational movement of the output shaft is converted to incremental linear movements of the valve stem 68.

Thus by stepping the motor 15, the valve stem 68 can accordingly be positioned, but by virtue of the ball screw transmission, the valve stem 68 cannot readily be back driven e.g. by pressure differentially acting on the valve member 65, so that the valve stem 68 is maintained in a position to which it is moved by the operation of the stepper motor 15, and at least when the valve member 65 in engagement with the stop element 72 as described below, the valve member 65 is maintained in the position to which it is moved by the stepper motor 15 and transmission means.

As shown in FIG. 3, the valve stem 68 has been moved by the stepper motor 15 to the right. The only effect this has on first valve member 65 is to increase the biasing force applied to the first valve member 65 to urge the first valve member 65 into tighter engagement with the first valve seat 64.

When it is desired to disengage the first valve member 65 from the first valve seat 64 to permit of communication between the first 61 and second ports 62, the valve stem 68 is moved by the stepper motor 15 to the left as seen in the drawings. Because the first valve member 65 is slidable on the valve stem 68, the first valve member 65 is retained in engagement with the first valve seat 64 by the spring 70 unit a first stop element 72 carried by valve stem 68 engages the first valve member 65 to move the first valve member 65 against the force of the spring 70.

Preferably the first valve seat 64 and the first valve member 65 are designed so that the flow of gas from the first port 61 which is connected to the supply of pressurised gas, to the second port 62 which is connected to the G-suit 41 is metered so that small valve stem movements achieved by stepping the motor 15 as the valve stem 68 moves to close the valve, have a controlled effect on gas flow and so the pressure to which the G-suit 40 can be pressured, can be accurately controlled.

In this example, the first valve stem 68 is integral with or may be connected to a second valve stem 78 which is thus moved with first valve stem 68 by the stepper motor 15. The second valve stem 78 carries a second reaction element 81 on which one end of a second spring 80 bears, the other end of the spring 80 bearing on a second valve member 75 which is slidable on the second valve stem 78. The second valve member 75 is operable when engaged with a second valve seat 74 within the valve body 60 to prevent communication between the second 62 and third ports 63.

The second valve member 75 is shown in FIG. 3 lifted out of engagement with the second valve seat 74. This has been achieved by moving the second valve stem 78, with the first valve stem 68 to the right until a second stop element 82 carried on the valve stem 78 engages the second valve member 75 to move the second valve member 75 against its respective spring 80. When the second valve member 75 is clear of the second valve seat 74, pressurised gas in the G-suit 40 is vented to third port 63. Preferably again the second valve member 75 and second valve seat 74 are designed for a metered gas flow so that the pressure in the G-suit 40 can finely be controlled upon small precise stepped movements of the valve stem 78 under the control of the control system 10.

Of course by arranging the first 72 and second 82 stop members along the valve stems 68/78 more closely than the spacing between the first and second valve seats 64/74, it can be arranged that communication between the first 61 and third 63 ports is always prevented, so as to minimise gas wastage.

By virtue of the drive 15 being a stepper motor, the valve stems 68/78 can accurately be moved to provide for desired pressurisation/depressurisation of the G-suit 40, again with minimum gas wastage, in response to an operating signal to the drive 15.

The second valve member 75, like the first valve member 65 is mounted in the valve body 10 by a diaphragm 76 (or a piston), (but may be integrally provided with the diaphragm 76) which closes a second chamber 77 within the valve body 60.

Each of the first and second chambers 67/77 is connected via a respective line 90/91 to the second port 62, or at least to a zone of the valve 14 or to a conduit from the valve 14 which is at substantially the same pressure as the respective first 61 or third 63 port to which the second port 62 is connected. Thus the pressure behind the two diaphragms 66 and 76 in the chambers 67 and 77 are always equal to each other and to the pressure on the valve members 65 and 75. Thus the drive 15 when operated does not need to overcome any gas pressure in order to move a valve member 65 or 75, which also facilitates accurate control.

In the event that there is any tendency for either of the valve members 65 or 75 to remain in engagement with a respective valve seat 64 or 74, because the respective stop element 72 or 82 is brought positively into engagement with a respective valve member 65 or 75, there is no risk of the valve member 65 or 75 becoming jammed in a closed position.

Also, if there is any tendency for the either of the valve members 65,75 to remain in a disengaged position, increasing valve stem movement will cause an increasing biasing force to be applied to the respective valve member as the respective spring 70 or 80 compresses. Eventually, the respective reaction element 71 or 81 would positively engage the valve seat 65 or 75 to close the valve if the valve member 65 or 75 has not by then properly engaged its respective seat 64 or 74.

Various modifications may be made to the valve 14 without departing from the invention.

For example, instead of a pair of stop elements 72, 82 a single stop element may be provided although greater stem movement range may be required so that the stop element can operate both valve members 65 and 75. Instead of springs 70, 80 some other suitable biasing means may be provided. The valve stems 68 and 78 may be independently actuable by independent drives although the arrangement described is preferred to as this is less expensive and more compact and may more readily minimise the risk of gas wastage. Thus each of the valve members 65 and 75 may have underlap and the double valve is closed centred.

The diaphragm or piston mounting of the valve members 65 and 75 is an optional arrangement and need not be provided in another arrangement.

The first 61, second 62 and third ports 63 may be arranged otherwise than described if desired.

Thus whereas in the example described, the arrangement is such that the inlet and outlet ports 61,62,63 are always isolated from one another (closed centred), in another arrangement the inlet 61 and vent 63 ports could be arranged both to have overlaps so as always to be in communication with each other and/or with the outlet port 62.

Instead of the valve members 65,75 comprising "knife-edge" valve members as shown in the drawings, these may be provided by one or more valve spools.

Where the valve of the invention is a simple two port valve, the valve member 65 need not be moveable relative to the valve stem 68, and the spring 70 need not be provided.

Even where the valve 14 is a double tandem valve as described, one or both of the valve members 65, 75 may be immovable on the respective valve stems 68, 78 although the arrangement described above when both are moveable on their stems 68, 78 and spring biased, is preferred.

In another arrangement, some other means for connecting the rotational stepper motor 15 output shaft movement to incremental linear movements of the valve stem or stems 68, 78 may be provided, to the ball screw arrangement described.

What is claimed is:

1. A method of controlling a fluid in a life support system including at least one of a G-suit and a counterpressure garment, utilizing a control system including a control valve and there being means to provide an input to the control system to cause an actuator to move a moveable part of the valve to operate the valve to bring a parameter of the fluid, towards a desired value, and means to condition the input to provide a control signal to cause the actuator to move the moveable part of the valve and wherein in that the method comprises conditioning the input by comparing the input with reference information relating to the position of the moveable part of the valve, and when the comparison indicates that the position of the moveable part of the valve is not at a desired position, issuing the control signal incrementally to move the moveable part, and updating the reference information so that the updated reference information is available for future comparison with the input.

2. A method according to claim 1 wherein the input comprises a signal derived from a comparison between an instructing signal and a feedback signal, the feedback signal containing information concerning the actual value of the parameter of the fluid and the instructing signal depending upon a parameter value it is desired to attain.

3. A method according to claim 1 wherein the reference information comprises a model which models the physical response of the moveable part of the valve to the control signal based upon known valve characteristics so that when the reference information is updated the updated reference information is indicative of actual valve moveable part position.

4. A method according to claim 1 wherein the method includes not providing the control signal to the actuator in the event that the comparison between the reference information and the input indicates that the moveable part is less than a predetermined distance from the desired position.

5. A method according to claim 1 wherein the actuator is a stepper motor, the method comprising applying the control signal to drive the stepper motor to move a moveable part of the valve a predetermined number of steps.

6. A method according to claim 5 wherein the method is repeated a sufficient number of times to move the moveable part of the valve incrementally until the moveable part of the valve is in a desired position.

7. A method according to claim 1 wherein the valve controls one of fluid pressure and fluid flow in the life support system.

8. A control system for controlling fluid in a life support system including at least one of a G-suit and a counterpressure garment, the control system including a control valve which when operated changes a parameter of the fluid in the system, and a conditioning means to condition an input provided to the control system to operate an actuator of the valve means, the conditioning means being adapted to condition the input by comparing the input with reference information relating to the position of the moveable part of the valve means, and when the comparison indicates that the position of the moveable part of the valve means is not at a desired position, the conditioning means issuing the control signal incrementally to move the moveable part whilst updating the reference information so that the updated reference information is available for future comparison with the input.

9. A life support system for an aircrew member of an aircraft comprising at least one of a G-suit and a breathing system including a counterpressure garment, and a control system responsive to an input to control the pressure in the at least one of a G-suit and breathing system, the control system including a control valve which when operated changes said pressure, and a conditioning means to condition an input provided to the control system to operate an actuator of the valve means, the conditioning means being adapted to condition the input by comparing the in put with reference information relating to the position of the moveable part of the valve means, and when the comparison indicates that the position of the moveable part of the valve means is not at a desired position, the conditioning means issuing the control signal incrementally to move the moveable part whilst updating the reference information so that the updated reference information is available for future comparison with the input.

* * * * *